(12) United States Patent
Stenzel

(10) Patent No.: US 6,809,860 B2
(45) Date of Patent: Oct. 26, 2004

(54) MICROSCOPE

(75) Inventor: Ruediger Stenzel, Hilchenbach (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 354 days.

(21) Appl. No.: 09/986,609

(22) Filed: Nov. 9, 2001

(65) Prior Publication Data

US 2004/0001252 A1 Jan. 1, 2004

(30) Foreign Application Priority Data

Nov. 9, 2000 (DE) .......................................... 100 55 534

(51) Int. Cl.$^7$ .............................................. G02B 21/00
(52) U.S. Cl. .................... 359/381; 359/368; 359/388
(58) Field of Search ................................ 359/368–390, 359/800–819

(56) References Cited

U.S. PATENT DOCUMENTS

| | | | | |
|---|---|---|---|---|
| 4,241,251 A | * | 12/1980 | Yonekubo | .................. 250/205 |
| 4,531,816 A | * | 7/1985 | Baumgartel | ................. 359/382 |
| 4,544,236 A | * | 10/1985 | Endo | .......................... 359/814 |
| 4,555,620 A | * | 11/1985 | Bridson et al. | ............. 250/205 |
| 4,653,878 A | * | 3/1987 | Nakasato et al. | ........... 359/381 |
| 5,737,134 A | | 4/1998 | Watanabe et al. | ........... 359/821 |

* cited by examiner

Primary Examiner—Thong Q Nguyen
(74) Attorney, Agent, or Firm—Foley & Lardner LLP

(57) ABSTRACT

A microscope having a stand (3) and having a revolving nosepiece (1) rotatably articulated on the stand (3), the revolving nosepiece (1) having at least two receptacles (4) for one objective (2) each, and an objective (2) being deliverable into a beam path (5) of the microscope by the rotation of the revolving nosepiece (1), is configured, in the interest of easy association between an objective (2) and its position in the beam path (5) of the microscope, in such a way that one transponder (6) each is associated with the objective (2) or objectives (2), and a reading device (7) for communication with the transponder (6) is associated with the stand (3).

25 Claims, 5 Drawing Sheets

MICROSCOPE

CROSS REFERENCE TO RELATED APPLICATIONS

This invention claims priority of the German patent application 100 55 534.9-42 which is incorporated by reference herein.

FIELD OF THE INVENTION

The invention concerns a microscope having a stand and having a revolving nosepiece rotatably articulated on the stand, the revolving nosepiece having at least two receptacles for one objective each, and an objective being deliverable into a beam path of the microscope by the rotation of the revolving nosepiece.

BACKGROUND OF THE INVENTION

A microscope of the kind cited initially is known, for example, from U.S. Pat. No. 5,737,134. The microscope according to this example comprises a stand and a revolving nosepiece rotatably articulated on the stand. The revolving nosepiece comprises five receptacles each for one objective. By rotation of the revolving nosepiece, one respective objective is deliverable into the beam path of the microscope.

In the known microscopes, rotation of the revolving nosepiece and thus also delivery of the desired objective into the beam path are accomplished by means of an electrical drive. With this kind of automated microscope, in particular, it is important that no association errors occur upon this delivery of the objectives into the beam path. Care must be taken that exactly the desired objective is delivered into the beam path. For example, the adjustment of the illuminating light intensity and the positioning of a specimen stage may depend on this exact association.

In the known microscopes, the rotational position of the revolving nosepiece can be ascertained by way of a magnetic code, each ascertained rotational position of the revolving nosepiece corresponding to a specific objective in the beam path of the microscope. For that purpose, the revolving nosepiece comprises specific receptacles for specific objectives, so that in general it is possible to detect which objective is presently located in the beam path.

Since, in the known microscopes, not only must the revolving nosepiece comprise a magnetic code but also the receptacles of the revolving nosepiece must be specifically configured for different objectives, detecting or ascertaining the objective that has been or is to be delivered into the beam path is extraordinarily complex.

SUMMARY OF THE INVENTION

An object of the present invention is to configure and further develop a microscope of the kind cited initially in such a way as to make possible easy association between an objective and its position in the beam path of the microscope.

In one embodiment of the present invention, there is a microscope having a stand and having a revolving nosepiece rotatable articulated on the stand, the revolving nosepiece having at least two receptacles for one objective each, and an objective being deliverable into a beam path of the microscope by the rotation of the revolving nosepiece, wherein a transponder is respectively associated with at least one objective and a reading device for communication with the transponder is associated with the stand.

According to an embodiment of the present invention, the microscope of the kind cited initially is configured in such a way that one transponder each is associated with the objective or objectives, and a reading device for communication with the transponder is associated with the stand.

What has been recognized according to the present invention is that the use of a transponder associated with the objective or objectives, in combination with a reading device associated with the stand, achieves the above object in surprisingly simple fashion. All that is necessary in this context is to associate a transponder with the objective and a reading device with the stand. The revolving nosepiece no longer needs to be equipped with a code or with special, objective-specific receptacles. By way of a suitable arrangement of the reading device, it is easy to ascertain whether the desired objective is present in the position defined by the location of the reading device.

The microscope according to the present invention consequently describes a microscope in which easy association of an objective with its position in the beam path of the microscope is made possible.

In a concrete embodiment, the transponder could be arranged on the barrel of the objective or objectives. The arrangement of the transponder on the barrel of the objective or objectives is to be selected in such a way that when the objective is installed in the revolving nosepiece, reliable communication with the reading device can occur.

Practical experience has shown that it is particularly favorable to arrange the transponder on the upper side of the baffle plate of the objective or objectives. Any interference with use of the objective by the transponder is thereby avoided, and secure arrangement of the transponder is at the same time achieved.

In the interest of particularly secure arrangement of the transponder, the baffle plate could comprise a preferably lateral cutout. A cutout of this kind could be constituted, in particularly simple fashion, by a milled recess. After the objective is threaded into the revolving nosepiece, there is created between the cutout and the revolving nosepiece a kind of pocket that could receive the transponder.

In the interest of reliable communication with the reading device, the transponder could comprise an antenna or antenna coil. Concretely, the antenna or antenna coil could be arranged on the screw ring of the objective or objectives.

The antenna or antenna coil could moreover be attached directly to the transponder. The transponder could be bonded or soldered onto the antenna or antenna coil. A greater degree of miniaturization could be achieved by the bonding between transponder and antenna.

Alternatively or in addition thereto, the transponder and the antenna or antenna coil could be arranged in a common housing. The transponder could be embodied as a simple read transponder or as a combined read-write transponder. In this context, it would be conceivable for the transponder to emit predefined code data or to be capable of being loaded with code data that it can emit after corresponding loading and after activation.

In the interest of reliable activation of the transponder by the reading device, an excitation coil could be associated with the reading device. The transponder could draw its transmission energy from the transmission energy of the reading device. In that case a separate power supply for the transponder would not be necessary.

In particularly simple fashion, the reading device could be attached to the stand at a suitable point. In particularly effective fashion, the reading device could be arranged in the revolving nosepiece. Particularly reliable communication between the transponder and the reading device would thereby be implemented.

Concretely, the reading device could comprise a read antenna and an electronic readout system. At least the read antenna could be attached to the stand and/or arranged in the revolving nosepiece. Concretely, an arrangement of the read antenna around the optical axis of the microscope has proven particularly favorable.

The electronic readout system could be arranged in the revolving nosepiece or integrated into the revolving nosepiece. As an alternative to this, the electronic readout system could also be arranged remotely from the revolving nosepiece and, if applicable, separately from the microscope.

In the interest of particularly versatile utilization of the arrangement of transponder and reading device, the reading device could additionally comprise a writing unit. The reading device would thus be a more or less combined read-write unit. A wide variety of data could thereby be stored in and read out from the transponder.

Concretely, the magnification and/or type of the particular objective could be stored in the transponder. Alternatively or in addition thereto, the degree of correction of the objective or objectives, the equalization length, and/or the color profile could be stored in the transponder. Also alternatively or additionally, the wavelength and/or line width of filters or filter systems could be stored in the transponder. Distribution data, batch numbers, and/or maintenance or repair data could furthermore be stored in the transponder. No limits are set in terms of the stored data. What is stored is to be targeted toward the particular application.

Very generally, the transponder could be provided as a component of the objective or as an accessory for retrofitting to one or more objectives.

In a transponder, data transfer takes place via oscillations. Concretely, a microchip could be provided in the transponder. By way of the reading device, the data stored in the transponder can be transferred in non-contact fashion into a computer for further processing. The transponder initiates the reading operation in more or less independent fashion as soon as it is within range of the reading device.

Wireless data transfer systems having a proximity switch function, which comprise two transmitter/receiver units of which at least one is mobile, are often referred to as transponders. The one mobile unit generally does not have its own power supply, but rather obtains its transmission energy—for the reply, if applicable—from the transmission energy of the stationary unit. It is characteristic in this context that a specific signal or action (for example, a warning signal or the opening of a door) is initiated when the bearer of the mobile unit (for example a person having a check card or an object, for example an article of clothing with a security badge) approaches to within a specific distance of, at most, a few meters of the stationary unit. In the simplest case a yes/no signal is not simply transmitted as the information, but rather a check is made as to whether a high or low level of energy is being drawn by the mobile unit from the stationary transmitter, for example with an LC oscillator circuit. If a high level of energy is being drawn, i.e. if a strong resonance effect is present because the mobile unit is close by, a switching signal is generated in the stationary unit. This is referred to as a proximity switch function.

BRIEF DESCRIPTION OF THE DRAWINGS

There are various ways of advantageously embodying and developing the teaching of the present invention. In conjunction with the explanation of the preferred exemplary embodiment of the invention with reference to the drawings, an explanation is also given of generally preferred embodiments and developments of the teaching. In the drawings.

DETAILED DESCRIPTION OF THE INVENTION

Figure 1:
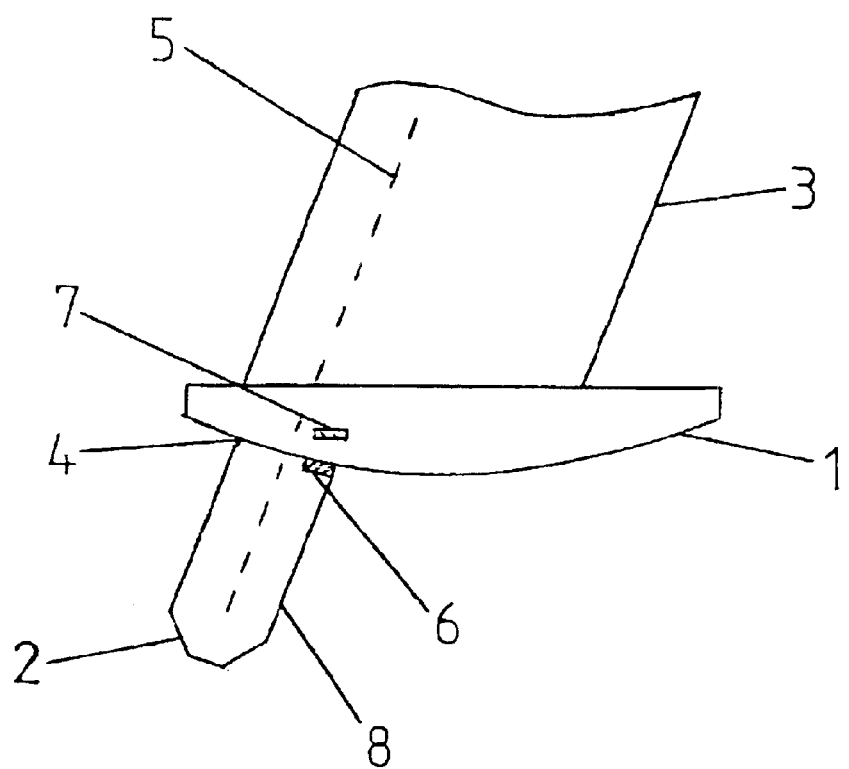
FIG. 1 schematically shows, in a side view, the exemplary embodiment of the microscope according to the present invention, for the sake of simplicity only the region of the revolving nosepiece with a threaded in objective being shown.

FIG. 1 shows, in a schematic side view, the exemplary embodiment of the microscope according to the present invention, for the sake of simplicity only the region of revolving nosepiece 1 with a threaded-in objective 2 being shown. Stand 3 of the microscope is also partially depicted, revolving nosepiece 1 being rotatably articulated on stand 3. Revolving nosepiece 1 has at least two receptacles 4, each for an objective 2. An objective 2 can be delivered into a beam path 5 of the microscope by rotation of revolving nosepiece 1. In the interest of easy association of an objective 2 with its position in beam path 5 of the microscope, one transponder 6 each is associated with objective 2 or objectives 2, and a reading device 7 for communication with transponder 6 is associated with stand 3.

Stated more exactly, transponder 6 is arranged on barrel 8 of objective 2. Stated even more precisely, transponder 6 is arranged on the upper side of the baffle plate of objective 2. For that purpose, the baffle plate comprises a preferably lateral cutout.

Figure 2:
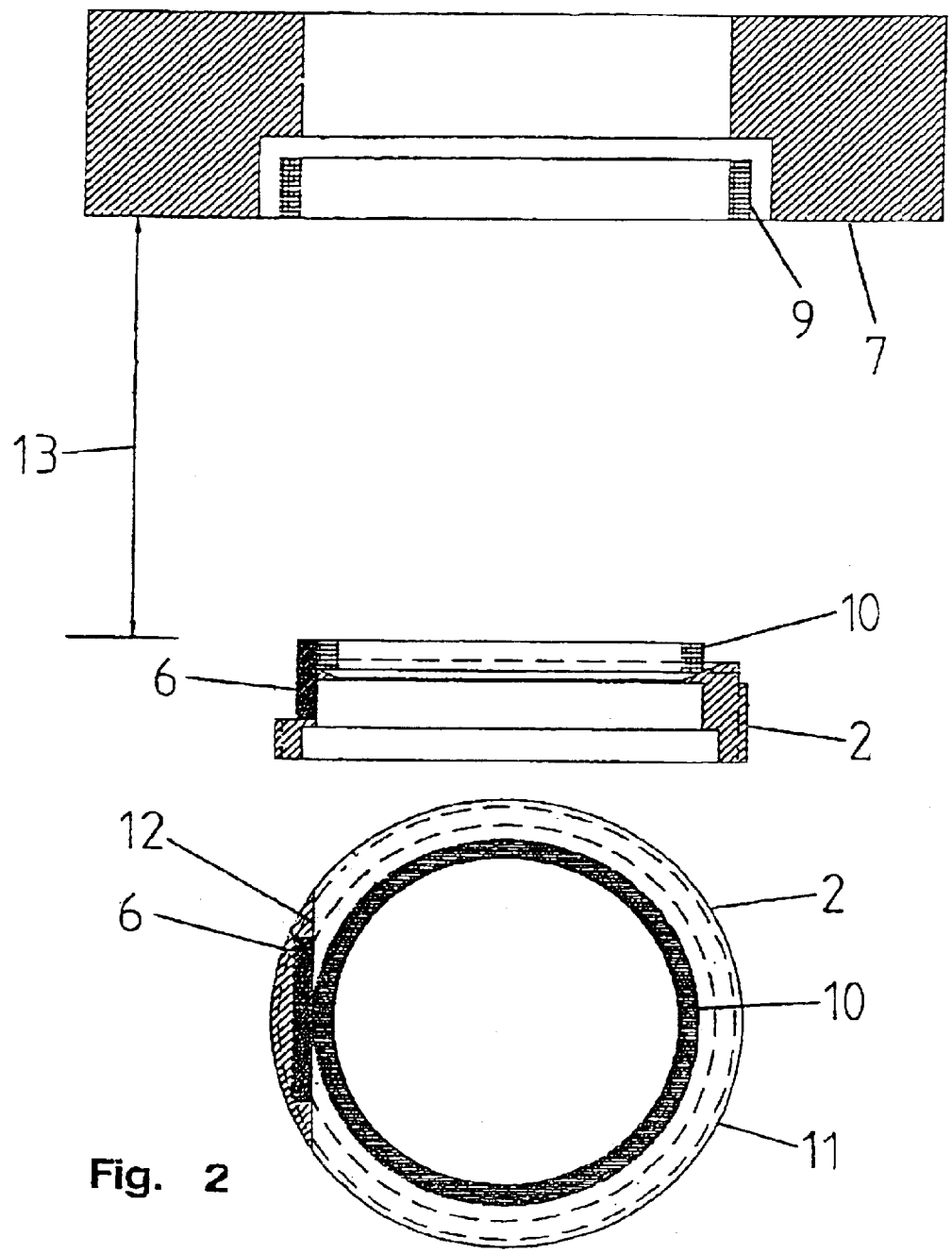
FIG. 2 shows, in a sectioned depiction, in the upper part of the Figure the read antenna of the reading device, and in the lower part of the Figure, in a plan view and a sectioned depiction, the transponder with associated antenna on the screw ring of the objective of FIG. 1

FIG. 2 shows, in the upper part of the Figure and in a sectioned depiction, reading device 7 with its read antenna 9. Depicted in the lower part of FIG. 2 is transponder 6 with its associated antenna 10, which is arranged on the screw ring of objective 2. Stated more exactly, antenna 10 is arranged on baffle plate 11 of objective 2. The transponder is arranged in a milled-out cutout 12.

Read antenna 9 is mounted in revolving nosepiece 1 around the optical axis. Both read antenna 9 of reading device 7 and antenna 10 of transponder 6 are configured as coils.

Also shown in the lower part of FIG. 2, in a sectioned depiction, is the upper part of objective 2.

Double arrow 13 indicates the reading distance between read antenna 9 and transponder 6. The reading distance could be 7 to 9 mm.

To avoid repetition, regarding additional embodiments and developments of the teaching according to the present invention the reader is referred on the one hand to the general portion of the specification and on the other hand to the appended claims.

Figure 3:
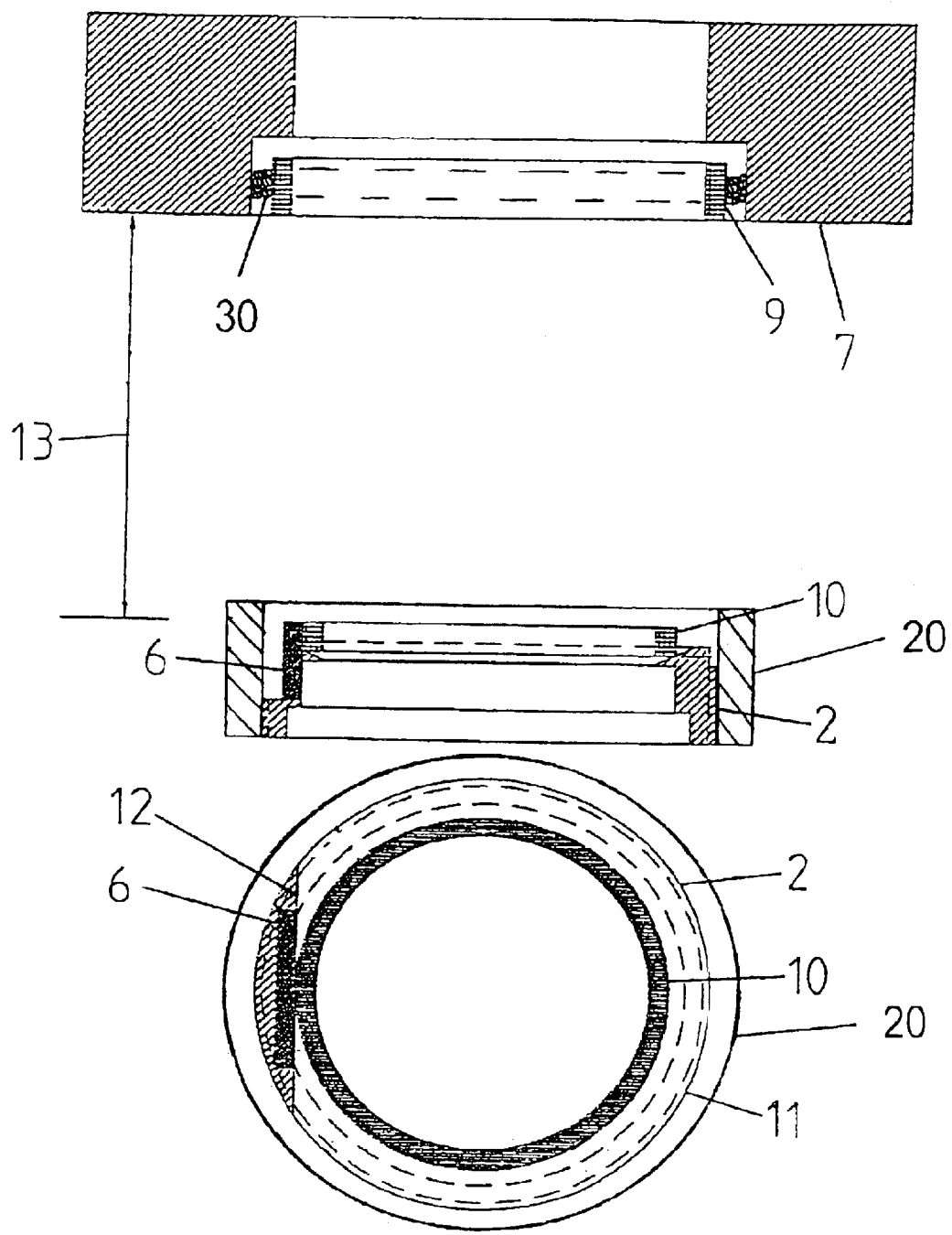
FIG. 3 shows, in a sectioned depiction, the addition of a housing to the components shown in FIG. 2.
Figure 4:
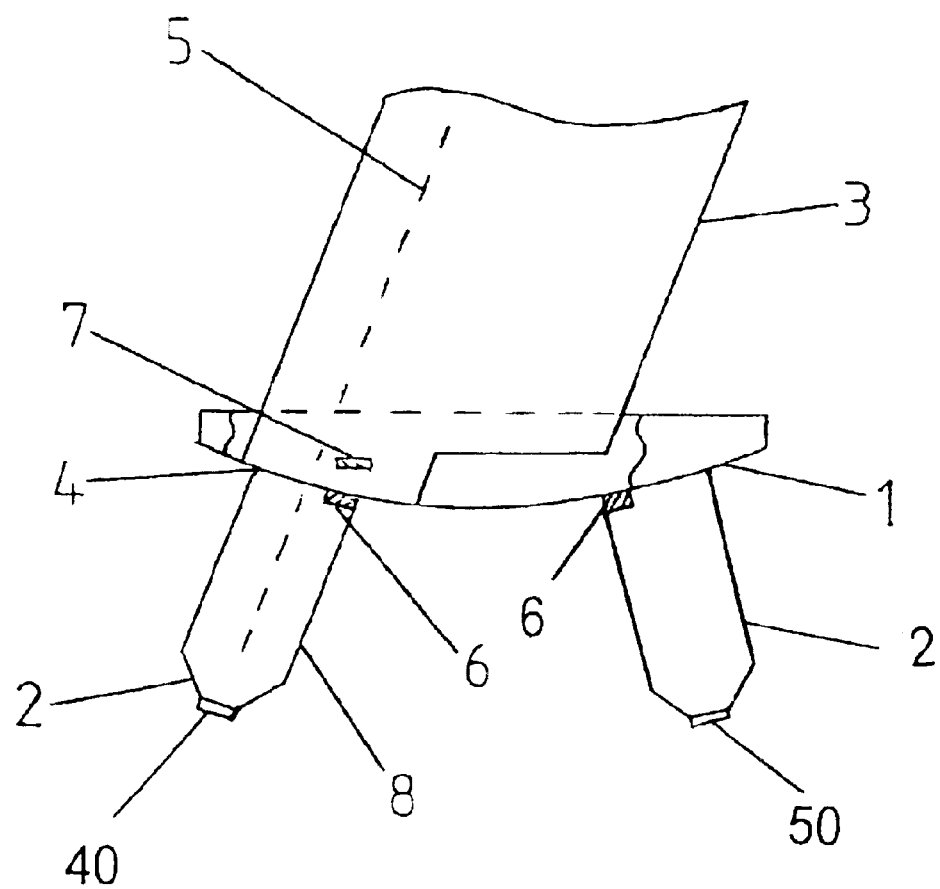
FIG. 4 shows, in a side view, an exemplary embodiment of the invention where the reading device 7 is attached to the stand 3 and is arranged in the revolving nosepiece.

As noted above and shown in FIG. 3, the transponder 6 and the antenna 10 or antenna coil can be arranged in a common housing 20. Also as noted above, an excitation coil 30 may be associated with the reading device 7, as is depicted in FIG. 3. In yet other embodiments of the present invention, as depicted in FIG. 4, the read device 7 may be mounted on the stand 3. FIG. 4 also shows that filters 40 and 50 may be located on objectives 2.

Figure 5:
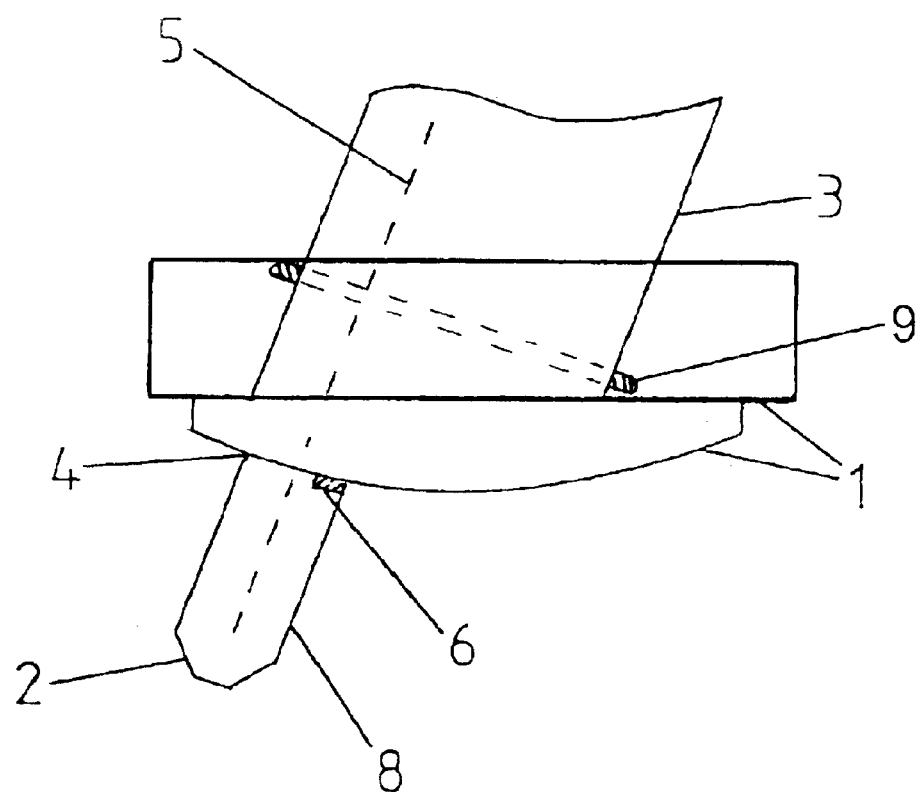
FIG. 5 shows, in a side view, the read antenna attached to the stand and arranged in the revolving nosepiece.

In yet another embodiment of the invention, as depicted in FIG. 5, the read antenna 9 is attached to the stand 3 and/or arranged in the revolving nosepiece 1. In conclusion, let it be emphasized very particularly that the exemplary embodiment selected above in purely arbitrary fashion serves merely for discussion of the teaching according to the present invention, but does not limit it to this exemplary embodiment.

Parts List

1 Revolving nosepiece
2 Objective
3 Stand
4 Receptacle
5 Beam path
6 Transponder
7 Reading device
8 Barrel
9 Read antenna
10 Antenna
11 Baffle plate
12 Cutout
13 Double arrow

What is claimed is:

1. A microscope including a stand (3) and including a revolving nosepiece (1) rotatable articulated on the stand (3), the revolving nosepiece (1) including at least two receptacles (4) adapted to receive one objective (2) each, and an objective (2) being deliverable into a beam path (5) of the microscope by the rotation of the revolving nosepiece (1), wherein a transponder (6) is respectively associated with at least one objective (2), and wherein a reading device (7) for communication with the transponder (6) is associated with the stand (3).

2. The microscope as defined in claim 1, wherein the transponder (6) is respectively arranged on a barrel (8) of the at least one objective (2).

3. The microscope as defined in claim 1, wherein the transponder (6) is arranged on an upper side of a baffle plate (11) of the at least one objective (2).

4. The microscope as defined in claim 3, wherein the baffle plate (11) comprises a lateral cutout (12).

5. The microscope as defined in claim 4, wherein the cutout (12) is a milled recess.

6. The microscope as defined in claim 1, wherein the transponder (6) comprises an antenna (10) or antenna coil.

7. The microscope as defined in claim 6, wherein the antenna (1) or antenna coil is arranged on a screw ring of the at least one objective (2).

8. The microscope as defined in claim 6, wherein the antenna or antenna coil (10) is attached to the transponder (6).

9. The microscope as defined in claim 6, wherein the transponder (6) is bonded or soldered onto the antenna (10) or antenna coil.

10. The microscope as defined in claim 6, wherein the transponder and the antenna or antenna coil are arranged in a common housing.

11. The microscope as defined in claim 1, wherein the transponder is a read transponder.

12. The microscope as defined in claim 1, wherein the transponder (6) is a read-write transponder.

13. The microscope as defined in claim 1, wherein an excitation coil for activation of the transponder (6) is associated with the reading device (7).

14. The microscope as defined in claim 1, wherein the reading device (7) is attached to the stand (3).

15. The microscope as defined in claim 1, wherein the reading device (7) is arranged in the revolving nosepiece (1).

16. The microscope as defined in claim 1, wherein the reading device (7) comprises a read antenna (9) and an electronic readout system.

17. The microscope as defined in claim 16, wherein the read antenna (9) is attached to the stand (3) and/or arranged in the revolving nosepiece (1).

18. The microscope as defined in claim 16, wherein a read antenna (9) is arranged around an optical axis of the microscope.

19. The microscope as defined in claim 16, wherein the electronic readout system is arranged in the revolving nosepiece (1) or integrated into the revolving nosepiece (1).

20. The microscope as defined in claim 1, wherein the reading device (7) additionally comprises a writing unit.

21. The microscope as defined in claim 1, wherein information relating to magnification and/or type of the at least one objective (2) are stored in the transponder (6).

22. The microscope as defined in claim 1, wherein a degree of correction of the at least one objective (2) an equalization length, and/or a color profile are stored in the transponder (6).

23. The microscope as defined in claim 1, wherein information relating to wavelength and/or line width of filters or filter systems are stored in the transponder (6).

24. The microscope as defined in claim 1, wherein distribution data, batch numbers, and/or maintenance or repair data are stored in the transponder (6).

25. The microscope as defined in claim 1, further comprising a plurality of transponders respectively associated with a plurality of objectives being deliverable into the beam path.

* * * * *